(12) United States Patent
Jin et al.

(10) Patent No.: US 11,377,712 B2
(45) Date of Patent: *Jul. 5, 2022

(54) HOT DIPPED HIGH MANGANESE STEEL AND MANUFACTURING METHOD THEREFOR

(71) Applicant: BAOSHAN IRON & STEEL CO., LTD., Shanghai (CN)

(72) Inventors: Xinyan Jin, Shanghai (CN); Yong Zhong, Shanghai (CN); Guangkui Hu, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 242 days.

This patent is subject to a terminal disclaimer.

(21) Appl. No.: 16/616,109

(22) PCT Filed: Apr. 20, 2018

(86) PCT No.: PCT/CN2018/083849
§ 371 (c)(1),
(2) Date: Nov. 22, 2019

(87) PCT Pub. No.: WO2018/214683
PCT Pub. Date: Nov. 29, 2018

(65) Prior Publication Data
US 2020/0216927 A1    Jul. 9, 2020

(30) Foreign Application Priority Data
May 26, 2017  (CN) .......................... 201710383388.1

(51) Int. Cl.
C21D 9/56          (2006.01)
C22C 38/00        (2006.01)
(Continued)

(52) U.S. Cl.
CPC ............ *C21D 9/561* (2013.01); *B32B 15/013* (2013.01); *C21D 1/26* (2013.01); *C21D 1/74* (2013.01);
(Continued)

(58) Field of Classification Search
CPC . C21D 9/561; C21D 1/26; C21D 1/74; C21D 6/005; C21D 2211/001;
(Continued)

(56) References Cited

U.S. PATENT DOCUMENTS

| | | | |
|---|---|---|---|
| 2014/0209216 A1* | 7/2014 | Chin | ................. C22C 38/54 148/533 |
| 2020/0157671 A1* | 5/2020 | Jin | ..................... C21D 6/005 |
| 2020/0216927 A1* | 7/2020 | Jin | ..................... B32B 15/013 |

FOREIGN PATENT DOCUMENTS

| | | |
|---|---|---|
| CN | 101660086 | 3/2010 |
| CN | 102140606 | 8/2011 |

(Continued)

OTHER PUBLICATIONS

Office Action dated Nov. 24, 2020 for Japanese Patent Application No. 2019-565222.
(Continued)

*Primary Examiner* — Scott R Kastler
(74) *Attorney, Agent, or Firm* — Lei Fang; Smith Tempel Blaha LLC

(57) ABSTRACT

A hot dipped high manganese steel and a manufacturing method therefor. The high manganese steel comprises a steel base plate and a coating on the surface of the steel base plate. The core of the steel base plate is austenite. The surface layer of the steel base plate is a ferrite fine grain layer. The ferrite fine grain layer comprises an oxide of Al. Furthermore, the steel base plate of the hot dipped high manganese steel comprises, in mass percentages, 10 to 30% of Mn element,
(Continued)

1 to 2% of Al element, and 0.4 to 0.8% of C element. The manufacturing method comprises: 1) manufacturing strip steel; 2) primary annealing and acid washing; 3) secondary annealing and hot dipping.

21 Claims, 4 Drawing Sheets

(51) Int. Cl.
*C23C 2/06* (2006.01)
*B32B 15/01* (2006.01)
*C21D 1/26* (2006.01)
*C21D 1/74* (2006.01)
*C21D 6/00* (2006.01)
*C22C 18/04* (2006.01)
*C22C 38/02* (2006.01)
*C22C 38/04* (2006.01)
*C22C 38/06* (2006.01)
*C23C 2/40* (2006.01)

(52) U.S. Cl.
CPC .............. *C21D 6/005* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C23C 2/06* (2013.01); *C23C 2/40* (2013.01); *C21D 2211/001* (2013.01); *C21D 2211/005* (2013.01)

(58) Field of Classification Search
CPC . C21D 2211/005; C22C 18/04; C22C 38/001; C22C 38/002; C22C 38/02; C22C 38/04; C22C 38/06; C23C 2/06; C23C 2/40; B32B 15/013
See application file for complete search history.

(56) References Cited

FOREIGN PATENT DOCUMENTS

| | | |
|---|---|---|
| CN | 106319356 | 1/2017 |
| JP | 2007321198 | 12/2007 |
| JP | 2009521596 A | 6/2009 |
| JP | 2010150660 A | 7/2010 |
| JP | 2015171729 | 10/2015 |
| JP | 2016508183 A | 3/2016 |
| WO | 2009084793 A1 | 7/2009 |

OTHER PUBLICATIONS

International Search Report and Written Opinion dated Jul. 4, 2018 for PCT Patent Application PCT/CN2018/083849.

* cited by examiner

US 11,377,712 B2

HOT DIPPED HIGH MANGANESE STEEL AND MANUFACTURING METHOD THEREFOR

CROSS-REFERENCE TO RELATED APPLICATIONS

This application is a 371 U.S. National Phase of PCT International Application No. PCT/CN2018/083849 filed on Apr. 20, 2018, which claims benefit and priority to Chinese patent application no. 201710383388.1 filed on May 26, 2017. Both of the above-referenced applications are incorporated by reference herein in their entireties.

TECHNICAL FIELD

The present disclosure relates to high-strength steel, particularly to a hot dipped high manganese steel and a method for manufacturing the same.

BACKGROUND ART

Advanced high-strength steel is the best material that meets the requirements of automobile weight reduction and safety improvement against collision. Along with the continuous in-depth development of advanced high-strength steel by steel companies around the world, steel grades with both higher strength and higher elongation have been developed in succession.

In the advanced high-strength steel family, there is a high manganese steel which is characterized by twinning induced plasticity (TWIP). Even if the tensile strength reaches 1000 MPa or more, the elongation at break can still be as high as 50% or more. Hence, it is particularly suitable for manufacture of automotive parts that require both high strength and high formability. One of the characteristics of this steel is that a full austenitic structure is obtained at room temperature by addition of Mn into the steel at a relatively high content. At present, there are Fe—Mn—Si—Al system, Fe—Mn—C system, Fe—Mn—Al—C system, etc., and their common feature is a high Mn content, usually in the range of 6-30% by mass.

However, the surface of cold-rolled high manganese steel is prone to rusting. Therefore, it is desirable to plate the surface of the high manganese steel with a metal coating to avoid corrosion of the steel material. The most typical coating is a hot-dip galvanized coating. However, the high manganese in the compositional design of high manganese steel renders hot-dip galvanizing a challenge. The reason is that, when strip steel is annealed in a reducing atmosphere, although the atmosphere is reductive to Fe, it is oxidative to elements such as Mn, Si, and Al, so that these alloying elements will be enriched in the surface of the strip steel during the annealing of the strip steel and form an oxide film that affects the wettability of the zinc liquid, resulting in skip plating or poor adhesion of the coating.

In order to eliminate the adverse influence of the surface enrichment of the alloying elements on the wettability of the zinc liquid to the advanced high-strength steel, the solutions revealed to date mainly include improving compositional design, controlling annealing atmosphere, pre-plating metal before annealing, and pickling before immersion in a plating bath.

To improve compositional design, in addition to minimizing the contents of harmful elements, it is also possible to introduce one or more additional elements to change the surface enrichment state of Mn. The additional elements in the prior art include Sb, Sn, and the like.

For example, a Chinese patent document, namely Chinese Patent Publication No. CN101346489B, entitled "a high corrosion-resistance high Mn steel plate and a method for manufacturing a galvanized steel plate", discloses a high manganese hot dipped steel plate having high corrosion resistance and a method for manufacturing the same. This patent defines that the substrate steel plate comprises 5 to 35% of Mn by weight, and one or more of Sb, Sn, As or Te elements may be selectively added at 0.005-0.05% to inhibit diffusion of such elements as Al, Si, Mn, etc to the surface of the steel substrate, thereby effectively preventing uncoating and improving the uniformity of coating.

As another example, a Chinese patent document, namely Chinese Patent Publication No. CN103890215A, entitled "high manganese steel with superior weldability and a method for manufacturing a hot-dip galvanized steel plate from the same", discloses a high manganese steel with superior coating adhesion. This patent takes advantage of the property that Sn does not oxidize in the course of high temperature annealing, but deposits on the surface of a steel plate, so as to suppress surface diffusion of elements such as Al, Mn, Si, etc, which are prone to oxidation in the an iron matrix, thereby reducing the thickness of the surface oxides and changing the composition of the surface oxides. As a result, the effect of galvanization is improved. The amount of Sn that may be added is limited to 0.06 to 0.2%.

As another method to improve the platability of advanced high-strength steel, control of annealing atmosphere mainly includes controlling the dew point of the annealing atmosphere, adjusting the contents of $H_2$ and $H_2O$ in the annealing atmosphere, etc. When the contents of the Mn and Si elements are low, adjustment of the above parameters may improve the platability to some extent, but the effect is not obvious for high manganese steel with a very high Mn content.

For example, a Chinese patent document, namely Chinese Patent Publication No. CN101506403B, entitled "a method for coating a hot- or cold-rolled steel strip containing 6-30% by weight of Mn with a metallic protective layer", discloses a process for coating a hot- or cold-rolled steel strip with a metallic protective layer. This method is characterized in that, in order to produce a metallic protective layer substantially free of oxidic sub-layers on the steel strip, the % $H_2O/\%\ H_2$ ratio of the water content % $H_2O$ to the hydrogen content % $H_2$ in the annealing atmosphere is adjusted as a function of the respective annealing temperature $T_G$ as follows: % $H_2O/\%\ H_2 \le 8 \cdot 10^{-15} \cdot T_G^{3.529}$. In fact, in order to satisfy the above relationship, the $H_2$ content must be very high (such as 50% or even 100%), whereas the $H_2$ content in a heating furnace on a conventional hot-dip galvanizing line is usually only 1-10%.

For another example, a Chinese patent document, namely Chinese Patent Publication No. CN102421928B, entitled "a method for hot-dip coating of a flat steel product containing 2-35 wt. % of Mn, and a flat steel product", discloses a method for hot-dip coating of a flat steel product containing 2-35 wt % Mn with zinc or zinc alloy. The annealing atmosphere employed in this method contains 0.01-85 vol. % of $H_2$, $H_2O$ and the remainder $N_2$ and unavoidable impurities present for technical reasons and has a dew point lying between −70° C. and +60° C., wherein the $H_2O/H_2$ ratio satisfies: $8 \cdot 10^{-15} \cdot T_G^{3.529} < H_2O/H_2 \le 0.957$, resulting in a 20-400 nm thick layer of Mn mixed oxide on the flat steel product, wherein the layer covers the flat steel product at least in sections. Although the atmosphere in a conventional heating furnace on a hot-dip galvanizing line can satisfy the above relationship easily, the effect of improving galvanizing is very limited when the surface of the strip steel has a Mn mixed oxide layer of 20-400 nm.

As another example, a Chinese patent document, namely Chinese Patent Publication No. CN101760712B, entitled "a method for manufacturing a hot-dip galvanized steel plate of high manganese steel with superior coating surface quality", discloses a method for manufacturing a hot-dip galvanized high manganese steel plate with superior coating surface quality using high manganese steel as a matrix. The key of the method is that the high manganese steel containing 5 to 35 wt % Mn is selectively oxidized by heating at a heating temperature of 400 to 800° C. in a reducing atmosphere having a dew point of −20 to −40° C. for 10 to 40 seconds to form an internal oxide of manganese and form a porous surface oxide of manganese on the surface; subsequently, the high manganese steel is heated at a temperature of 800 to 850° C. in a reducing atmosphere having a dew point of −40 to −60° C. to reduce the surface oxide; and then the high manganese steel is immersed in a galvanizing bath containing 0.21 to 0.25 wt % Al for plating. Although a small amount of the Mn element undergoes internal oxidation when the dew point is −20 to −40° C., the external oxidation of Mn is still very serious when the steel is subsequently heated to 800 to 850° C. in a reducing atmosphere having a dew point of −40 to −60° C. Hence, the platability cannot be improved.

Pre-plating is still another method to improve the platability of high-strength steel. By pre-plating a steel plate surface with Fe, Cu, Ni, Al and other metals before annealing, formation of oxides of Si, Mn and the like at the interface between the steel substrate and the pre-coating is controlled during the annealing process, such that their enrichment in the surface is avoided.

For example, a Korean patent document, namely Korean Publication No. KR2011066689A, entitled "a method for manufacturing a hot-dip galvanized high manganese steel plate with superior platability", discloses a method for plating high manganese steel, the main feature of which is that the surface of the high manganese steel is pre-plated with Ni before annealing, so as to reduce Mn enrichment in the surface of the strip steel after annealing.

As another example, a Chinese patent document, namely Chinese Patent Publication No. CN100577843C, entitled "a method for steel strip coating and a steel strip provided with said coating", discloses a method for plating a steel strip, wherein the steel strip comprises Mn: 6-30% by weight, wherein the method is characterized in that an aluminum layer is applied to the steel strip prior to final annealing, and after the final annealing, the coating is applied to the aluminum layer. The key of this method is to coat a layer of aluminum on the surface of the high manganese steel (optionally by a PVD method, the thickness of the aluminum layer being 50-1000 nm) before annealing, which can inhibit external oxidation of the Mn element. The shortcoming of this pre-plating method is that the efficiency is very low, and it is difficult to meet the requirement of industrial continuous production. Moreover, the hardware investment of the pre-plating facility will be very high.

The pickling method mainly relies on acid washing to wash away the elements enriched in the surface of strip steel during annealing, thereby eliminating the adverse influence of the surface oxides on galvanizing.

For example, a Chinese patent document, namely Chinese Patent Publication No. CN101730752B, entitled "a method for hot dip galvanizing of AHSS or UHSS strip material, and such material obtained therefrom", discloses a method for hot dip galvanizing of dual phase steel, transformation induced plasticity steel, transformation induced plasticity assisted dual phase steel or twinning induced plasticity steel strip material, characterized in that the strip material is pickled and thereafter heated to a temperature below the continuous annealing temperature before the strip material is hot dip galvanized, wherein the temperature below the continuous annealing temperature is between 400 and 600° C., wherein the Fe in the strip material is reduced during or after the heating to a temperature below the continuous annealing temperature and before the hot dip galvanizing, and wherein an excess amount of 02 is provided in the atmosphere during or after the heating of the strip material and before the reduction of the strip material.

As another example, a Chinese patent document, namely Chinese Patent Publication No. CN101952474B, entitled "a method for coating 6-30 wt. % Mn-containing hot-rolled or cold-rolled flat steel product with metallic protective layer", discloses a method for coating a 6-30 wt. % Mn-containing hot-rolled or cold-rolled flat steel product with a metallic protective layer. This method is mainly characterized in that the steel flat product is subjected to a pickling treatment before entering the hot-dip melt bath, in which the steel flat product is exposed to at least two pickling baths, so that manganese oxide adhering to the steel flat product is removed. The pickled steel flat product needs to be dried before entering the melt bath to prevent the pickling liquid from entering the hot-dip coating facility. Meanwhile, the steel flat product needs to be reheated to a bath-entry temperature. In order to prevent oxide formation occurring again which impairs the coating result, before entering the melt bath, the surface temperature of the steel flat product should be controlled to not exceed 700° C. during the heating.

However, a conventional hot-dip galvanizing unit is usually arranged as heating, soaking, cooling, hot dipping, and re-cooling. The methods of the above two patents both involve first cooling a soaked steel strip to a pickling temperature (usually at least below 100° C.), then pickling, and then reheating to a bath-entry temperature for hot dipping. With the addition of the pickling stage, reheating stage and necessary temperature holding stages, the industrial production line will be very long, and the equipment cost will be very high.

High manganese steel has gained great attention in the steel industry and the automotive industry due to its excellent property of high strength and high elongation. Hot dipped high manganese steel is promising in its widespread applications in the future. As such, for promoting the industrial application of high manganese steel and weight reduction of automobiles, it is of great significance to provide a hot dipped high manganese steel and a method for producing the same in an economical way, by which the platability problem of high manganese steel can be solved, and hot dipped high manganese steel having excellent coating surface quality and excellent coating adhesion can be obtained.

SUMMARY

An object of the present disclosure is to provide a hot dipped high manganese steel and a method for manufacturing the same, wherein the hot dipped high manganese steel has the advantages of excellent coating surface quality, good coating adhesion and excellent corrosion resistance.

To achieve the above object, the technical solution of the present disclosure is as follows:

A hot dipped high manganese steel, comprising a steel substrate and a coating on a surface of the steel substrate, wherein the steel substrate has a core structure of austenite; the steel substrate has a skin layer which is a fine ferrite grain layer; the fine ferrite grain layer comprises an Al oxide, wherein the steel substrate of the hot dipped high manganese steel comprises 10 to 30% Mn, 1 to 2% Al and 0.4 to 0.8% C by mass.

The fine ferrite grain layer of the present disclosure may provide the hot dipped high manganese steel with excellent platability and coating adhesion.

The Mn element in a high manganese steel forms a surface layer with MnO enriched severely during the annealing process before hot dipping. This layer with MnO enriched affects the platability of the steel plate (i.e., poor surface quality of the coating) and the adhesion of the coating (i.e., the bonding force between the coating and the steel substrate is poor, and the coating tends to fall off easily).

In order to solve the above-mentioned two problems of the hot dipped high manganese steel, a fine ferrite grain layer is provided on the steel substrate having a high Mn content as a skin layer according to the present disclosure. As the Mn content in the fine ferrite grain layer is much lower than the Mn content in the steel substrate, formation of a MnO-rich layer on the surface of the fine ferrite grain layer during the annealing process before hot dipping is avoided. As a result, it's equivalent to conducting the hot dipping on the surface of ordinary ferritic steel, so that both the platability (surface quality) and coating adhesion (bonding force) of the steel plate are improved greatly.

Further, the fine ferrite grain layer has a thickness of 0.2 to 5 μm.

If the thickness of the fine ferrite grain layer is <0.2 μm, the external oxidation of the Mn and Al elements cannot be suppressed effectively. If the thickness is >5 μm, a longer annealing hold time will be needed. Therefore, the thickness of the fine ferrite grain layer is controlled to be 0.2 to 5 μm according to the present disclosure.

Further, when the grain size of the fine ferrite grain layer is >5 μm, the fine ferrite grain layer will be unduly thick. Hence, the grain size of the fine ferrite grain layer of the present disclosure is controlled to be ≤5 μm.

Further, the grain size of the fine ferrite grain layer is smaller than the grain size of the austenite in the steel substrate, because the growth of ferrite grains is suppressed by the oxide particles of Mn and Al present in the fine ferrite grain layer.

Further, the Mn content in the fine ferrite grain layer is lower than the Mn content in the steel substrate. The reason is that, under the conditions of a primary annealing process, Mn in the skin layer of the steel substrate diffuses into the surface of the steel plate, such that the skin layer of the steel substrate develops into a manganese-lean layer. Usually, the Mn content in the fine ferrite grain layer is ≤5%. Preferably, the Mn content in the fine ferrite grain layer is controlled to be ≤2%.

Further, the Al content in the fine ferrite grain layer is higher than the Al content in the steel substrate. The reason is that, under the conditions of the primary annealing process, a part of Al in the steel substrate diffuses into the skin layer of the steel plate, resulting in an increased Al content in the skin layer of the steel plate. When the Al content in the steel substrate is 1-2%, preferably, the Al content in the fine ferrite grain layer is >1%, and the Al content is <5%.

Further, the C content in the fine ferrite grain layer is lower than the C content in the steel substrate. The reason is that, under the conditions of the primary annealing process, the skin layer of the steel substrate undergoes decarburization reaction, thereby forming a decarburized skin layer. Preferably, the C content in the fine ferrite grain layer is ≤0.2%.

Further, the microstructure of the steel substrate is austenite.

Further, the steel substrate comprises Mn: 10 to 30%, Al: 1 to 2%, C: 0.4 to 0.8%, and a balance Fe and unavoidable impurities by mass.

In the compositional design of the steel substrate of the hot dipped high manganese steel according to the present disclosure:

Mn: It is an effective austenite stabilizing element. In a high manganese steel, the effect of Mn is similar to that of C, which can effectively increase the stacking fault energy of the material, lower the martensite transformation temperature Ms, and improve the austenite stability. In addition, unlike the effect of Mn in ordinary carbon steel, in the high manganese austenitic steel, an increased Mn content leads to a decreased material strength. Hence, provided that the stability of the austenite in the material is guaranteed, it is necessary to minimize the Mn content. Therefore, the mass percentage of the Mn element is limited to 10 to 30% according to the present disclosure.

Al: It can effectively improve the resistance of the material to delayed cracking. Nevertheless, the addition of Al may significantly deteriorate the smelting and continuous casting properties of a steel material, which may easily lead to nozzle clogging during continuous casting. Moreover, in the smelting and continuous casting process, formation of a large amount of $Al_2O_3$ will reduce the flowability of molten steel, causing problems such as slag entrapment, slab cracking, etc. The Al content should be minimized with the proviso that the delayed cracking property of the material is ensured to be qualified.

C: It is the most effective element in steel to stabilize austenite. It can effectively increase the stacking fault energy of the material, and inhibit the austenite transformation, thereby improving the austenite stability. Addition of a suitable amount of C into high manganese steel allows for significant reduction of the Mn content at the same level of stability of austenite, thereby reducing material cost.

Further, the hot dipped high manganese steel according to the present disclosure has a yield strength of 450-650 MPa, a tensile strength of 950-1100 MPa, and an elongation at break of >50%.

A method for manufacturing the hot dipped high manganese steel according to the present disclosure comprises the following steps:

(1) Manufacturing a strip steel
(2) Primary annealing and pickling
(3) Secondary annealing and hot dipping.

Among the above steps, the primary annealing and pickling in step (2) are performed on a continuous annealing production line. The strip steel is heated on the continuous annealing production line to a soaking temperature of 600 to 750° C. for a soaking time of 30 to 600 s, wherein the annealing atmosphere is a mixed gas of $N_2$ and $H_2$, the $H_2$ content is 0.5-10% by volume, and the dew point is −20 to +20° C. The annealed strip steel is cooled to below 100° C., and pickled with an acid solution having a hydrogen ion concentration of 0.1-5%, wherein the temperature of the acid solution is 50-70° C., and the pickling time is 1 to 10 s. Then, the strip steel is rinsed, dried and coiled.

The secondary annealing and hot dipping in step (3) are performed on a continuous hot dipping production line. The strip steel obtained in step (2) is subjected to the secondary annealing and accomplishes the hot dipping on the hot dipping production line. In the secondary annealing, the soaking temperature is 600-850° C., the soaking time is 60-360 s, and the annealing atmosphere is a mixed gas of $N_2$ and $H_2$, wherein the $H_2$ content is 2-10% by volume, and the dew point is −60 to +10° C. Subsequently, the strip steel is cooled to 380 to 500° C., and then immersed in a plating bath to perform the hot dipping.

According to the present disclosure, the soaking temperature and time, and the dew point of the annealing atmosphere are controlled, so that a manganese oxide layer is formed on the surface from the Mn element, and a manganese-lean, decarburized fine ferrite grain layer is formed as the skin layer of the steel substrate. Afterwards, a pickling process is used to wash away the manganese oxide layer on the surface of the steel plate that has been annealed in the primary annealing process, and the fine ferrite grain skin layer of the steel substrate is retained. In the secondary annealing, good platability is obtained by taking advantage of the fine ferrite grain skin layer of the steel substrate.

The soaking temperature in step (2) is limited to 600-750° C. for the reason that, if the soaking temperature is lower than 600° C., the amount of the Mn element enriched in the surface of the steel substrate is too limited to form a manganese-lean skin layer of the steel substrate, and as a result, the fine ferrite grain skin layer cannot be obtained; if the soaking temperature is higher than 750° C., the Mn element forms a large amount of oxide in the ferrite skin layer of the steel substrate, thereby deteriorating the formability of the fine ferrite grain skin layer. Further preferably, the soaking temperature in step (2) is 650 to 700° C.

Further, in step (2), the dew point of the annealing atmosphere is limited to −20° C. to +20° C. The reason is that the annealing atmosphere is reductive to Fe but oxidative to Mn in the above range of the dew point of the annealing atmosphere. If the dew point is lower than −20° C., the thickness of the fine ferrite grain skin layer of the steel substrate will be <0.2 μm. If the dew point is higher than +20° C., a large amount of internal oxide particles of Mn will form in the fine ferrite grain skin layer of the steel substrate, thereby affecting the performance of the skin layer. Preferably, the annealing atmosphere has a dew point of −10° C. to +10° C.

Preferably, the soaking time in step (2) is limited to 30-600 s, more preferably 30-180 s.

Preferably, the annealing atmosphere in step (2) is a mixed gas of $N_2$ and $H_2$, wherein the content of $H_2$ is 0.5-10% by volume.

The principle for controlling the acid solution concentration, temperature and time in step (2) is to wash away the manganese oxide layer on the surface and retain the fine ferrite grain skin layer. Therefore, an unduly high acid solution concentration, an unduly high acid solution temperature and an unduly long acid solution retention time will all result in washing away of the fine ferrite grain skin layer of the steel substrate. If the manganese oxide formed during the annealing process is too thick and the pickling is insufficient, the residual oxide layer is also disadvantageous for the hot dipping in step (3). Therefore, the acid solution concentration ranges from 0.1% to 5%, the pickling temperature is from 50 to 70° C., and the pickling time is from 1 to 10 s.

The annealing process parameters in step (3) may be selected within wide ranges, and it's not necessary to control the annealing atmosphere particularly. A conventional annealing atmosphere may be used to obtain the same platability as an ordinary ferrite material. The reason is that a fine ferrite grain layer of 0.2-5 μm already exists on the surface of the steel plate obtained in step (2), no Mn element prone to external oxidation exists in the fine ferrite grain skin layer of the steel substrate, and the Mn element in the steel substrate cannot surpass the fine ferrite grain layer and form a manganese oxide layer on the surface. Hence, when an annealing temperature, a hold time and a dew point of the annealing atmosphere that are usually used are used in the secondary annealing process, the manganese element in the steel substrate only undergoes a small amount of internal oxidation in the ferrite layer. In other words, the surface state of the steel plate treated by step (2) is equivalent to the surface state of ordinary mild steel, so that poor platability will not be resulted in wide ranges of process parameters.

Preferably, the annealing temperature in step (3) may be selected from 600 to 850° C.; the hold time is 60 to 360 s; the annealing atmosphere comprises $H_2$ in an amount of 2 to 10%; and the annealing atmosphere has a dew point of −60 to +10° C.

Further, in step (3), the plating bath comprises, in mass percentage, 0.1≤Al≤6%, 0<Mg≤5%, and a balance of Zn and other unavoidable impurities.

In the method for manufacturing the hot dipped high manganese steel according to the present disclosure, the purpose of adding 0.1-6% of Al in the plating bath is that, when the strip steel is immersed in a zinc pot, Al in the plating bath first reacts with the strip steel to form a barrier layer, thereby suppressing the diffusion between Zn and Fe to avoid formation of a zinc-iron alloy phase which adversely affects the forming property of the coating. The addition of Mg to the plating bath is advantageous for further improving the corrosion resistance of the coating. However, if the Mg content exceeds 5%, surface oxidation will be promoted, which is disadvantageous for production. Therefore, Mg is limited to 0 to 5% according to the present disclosure. Moreover, if the contents of Al and Mg are too high, the hardness of the coating will be increased, leading to deterioration of the forming property of the coating.

Preferably, the temperature of the strip steel at the time of entering the zinc pot is 0-10° C. higher than the plating bath temperature.

Preferably, the plating bath temperature is 420-480° C.

The beneficial effects of the invention include:

(1) By forming a fine ferrite grain layer on the surface of the steel substrate, the poor platability problem of the high manganese steel is solved, and good platability of the high manganese steel and good coating adhesion are achieved, thereby improving the corrosion resistance of the high manganese steel.

(2) The method for manufacturing the hot dipped high manganese steel according to the present disclosure can be implemented on existing continuous annealing and continuous hot dipping production lines without noticeable retrofit, and has a promising prospect of promotion and application.

DETAILED DESCRIPTION

The hot dipped high manganese steel and the manufacture method thereof according to the present disclosure will be further explained and illustrated with reference to the accompanying drawings and the examples. Nonetheless, the explanation and illustration are not intended to unduly limit the technical solution of the present disclosure.

Figure 1:
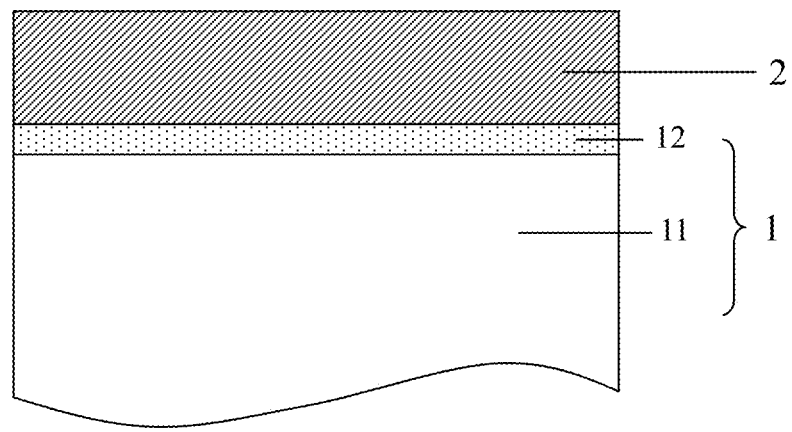
FIG. 1 is a schematic view showing a structure of a hot dipped high manganese steel according to the present disclosure.

FIG. 1 shows the structure of the hot dipped high manganese steel according to the present disclosure. As shown in FIG. 1, the hot dipped high manganese steel according to the present disclosure comprises a steel substrate 1 and a coating 2 on the surface of the steel substrate 1, wherein the core structure 11 of the steel substrate 1 is austenite, and the skin layer 12 of the steel substrate 1 is a fine ferrite grain layer.

Figure 2:
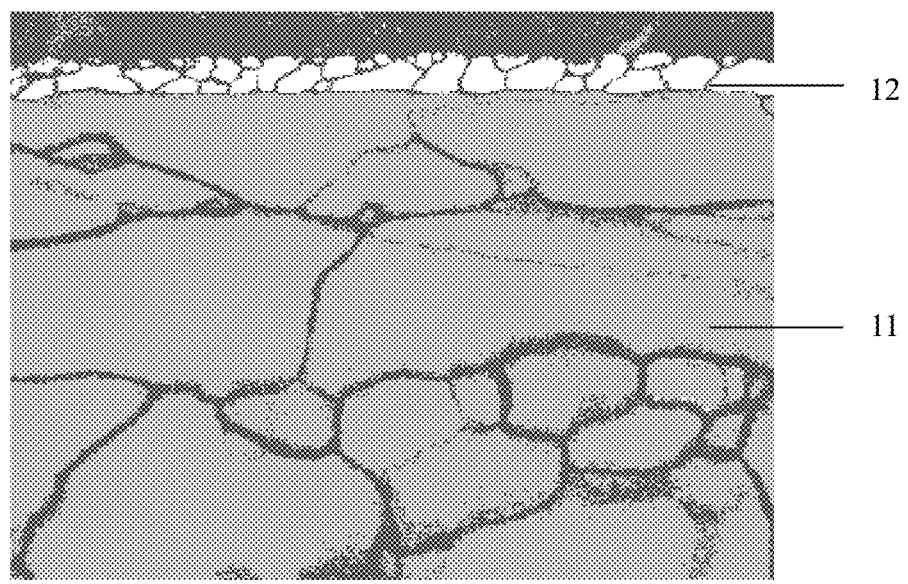
FIG. 2 shows a structure of the hot dipped high manganese steel according to the present disclosure before the hot dipping.

FIG. 2 shows a structure of the hot dipped high manganese steel according to the present disclosure before the hot dipping. As shown in FIG. 2, the core structure 11 of the steel substrate 1 is austenite, and the skin layer 12 of the steel substrate 1 is a fine ferrite grain layer, wherein the grain size of the ferrite is smaller than the grain size of the austenite in the steel substrate.

Table 1 lists mass percentages of the chemical components in the hot dipped high manganese steels of Examples 1 to 20 and the conventional steel plates of Comparative Examples 1-12, wherein the balance is Fe and unavoidable impurities.

As can be seen from Table 1, the mass percentage contents of the chemical components in Compositions I, II and III are controlled in the ranges of C: 0.4 to 0.8%, Mn: 10 to 30%, and Al: 1.0 to 2.0%, Si≤0.5%, P≤0.02%, S≤0.01%, N≤0.01%. The C and Mn contents in Composition IV are outside the above ranges.

TABLE 1

(unit: wt %)

| | C | Mn | Al | Si | N | P | S |
|---|---|---|---|---|---|---|---|
| I | 0.6 | 16 | 1.5 | 0.09 | 0.02 | 0.007 | 0.006 |
| II | 0.4 | 28 | 1.6 | 0.5 | 0.021 | 0.017 | 0.005 |
| III | 0.8 | 12 | 1.2 | 0.13 | 0.018 | 0.005 | 0.005 |
| IV | 0.3 | 7 | 1 | 0.2 | 0.011 | 0.008 | 0.01 |

The following steps were employed for the hot dipped high manganese steels in Examples 1-20:

(1) Manufacturing a strip steel;

(2) Primary annealing and pickling: The strip steel was heated on a continuous annealing production line to a soaking temperature of 600 to 750° C. for a soaking time of 30 to 600 s, wherein the annealing atmosphere was a mixed gas of $N_2$ and $H_2$, the $H_2$ content was 0.5-10% by volume, and the dew point was −20 to +20° C.; the annealed strip steel was cooled to below 100° C., and pickled with an acid solution having a hydrogen ion concentration of 0.1-5%, wherein the temperature of the acid solution was 50-70° C., and the pickling time was 1 to 10 s; then, the strip steel was rinsed, dried and coiled;

(3) Secondary annealing and hot dipping: the strip steel obtained in step (2) was subjected to secondary annealing and accomplished hot dipping on a hot dipping production line, wherein the soaking temperature in the secondary annealing was 600-850° C., the soaking time was 60-360 s, and the annealing atmosphere was a mixed gas of $N_2$ and $H_2$, wherein the $H_2$ content was 2-10% by volume, and the dew point was −60 to +10° C.; subsequently, the strip steel was cooled to 380 to 500° C., and then immersed in a plating bath to perform the hot dipping.

Table 2 lists the specific process parameters for the hot dipped high manganese steels of Examples 1 to 20 and the conventional steel plates of Comparative Examples 1-12.

Figure 3:
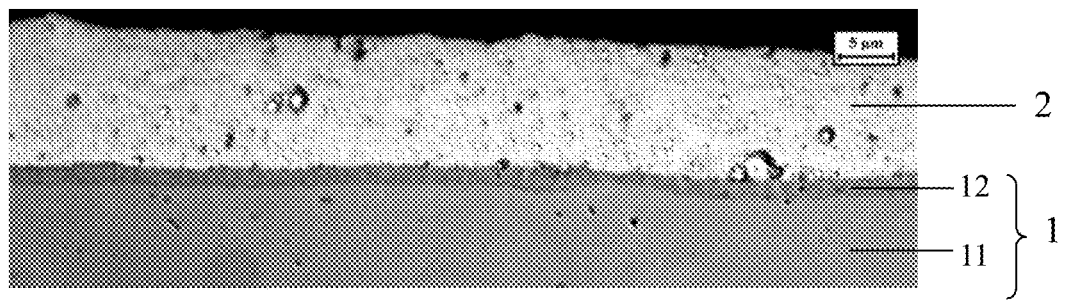
FIG. 3 is a metallographic photograph showing a cross section of Example 2 according to the present disclosure.

FIG. 3 shows the cross-sectional metallographic phase of the hot dipped high manganese steel in Example 2 according to the present disclosure. As shown in FIG. 3, the hot dipped high manganese steel comprises a steel substrate 1, a fine ferrite grain skin layer 2 on the steel substrate and a coating 1 covering 2.

Figure 4:
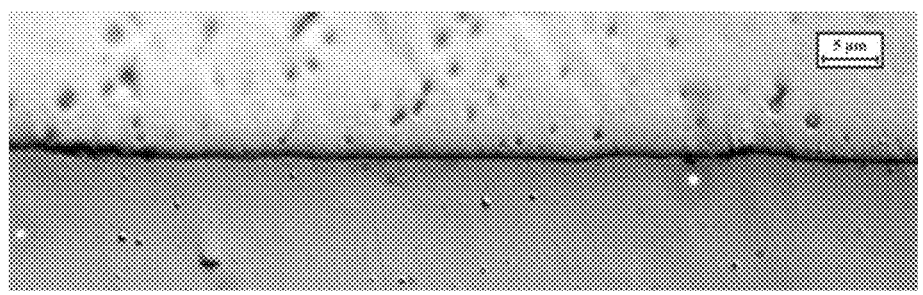
FIG. 4 is a metallographic photograph showing a cross section of Comparative Example 2.

FIG. 4 shows the cross-sectional metallographic phase of Comparative Example 2 in which the method for manufacturing the hot dipped high manganese steel according to the present disclosure was not utilized. As shown in FIG. 4, when the dew point of the annealing atmosphere is −40° C., a fine ferrite grain layer was not formed in the skin layer of the steel substrate. Although a coating was plated on the surface of the steel substrate, the coating adhesion was poor.

Figure 5:
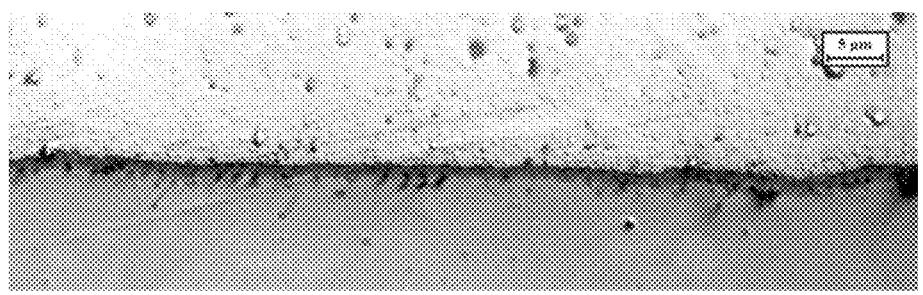
FIG. 5 is a metallographic photograph showing a cross section of Comparative Example 6.

FIG. 5 shows the cross-sectional metallographic phase of Comparative Example 6 in which the method for manufacturing the hot dipped high manganese steel according to the present disclosure was not utilized. As shown in FIG. 5, when the primary annealing temperature was 800° C. and the dew point of the annealing atmosphere was +10° C., although a fine ferrite grain layer was formed in the skin layer of the steel substrate, coarse oxide particles appeared in this layer, affecting the formability of the skin layer.

Figure 6:
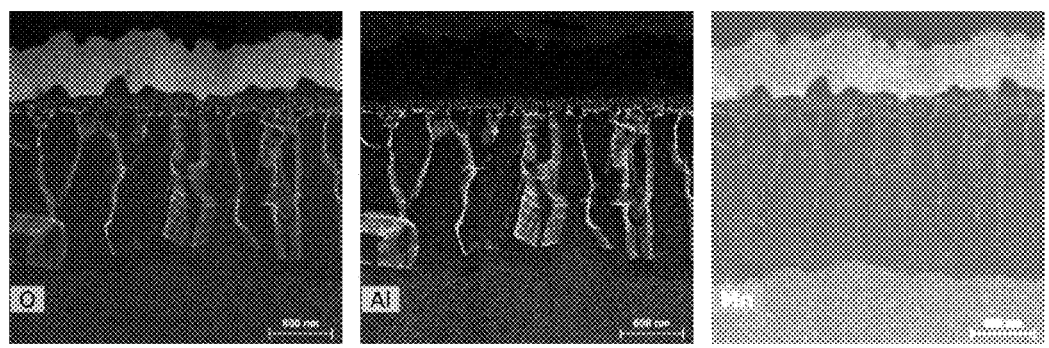
FIG. 6 shows maps of the O, Al, Mn elements in the cross-sectional metallographic phase of the skin layer after the primary annealing in Example 2.

FIG. 6 shows maps of the O, Al, Mn elements in the cross-sectional metallographic phase of the skin layer of the hot dipped high manganese steel in Example 2 after the primary annealing according to the present disclosure. As shown in FIG. 6, when the annealing temperature was 680° C., the dew point of the annealing atmosphere was 0° C., and the hold time was 170 s, after the primary annealing, a manganese oxide layer was formed on the surface of the steel plate; a manganese-lean, fine ferrite grain layer was formed under the manganese oxide layer; Al in the fine ferrite grain layer formed aluminum oxide which was mainly distributed along the ferrite grain boundary in a flake form, and the length direction of the flake was nearly perpendicular to the surface of the steel plate. Meanwhile, the oxide of Mn was not obvious in the fine ferrite grain layer.

Figure 7:
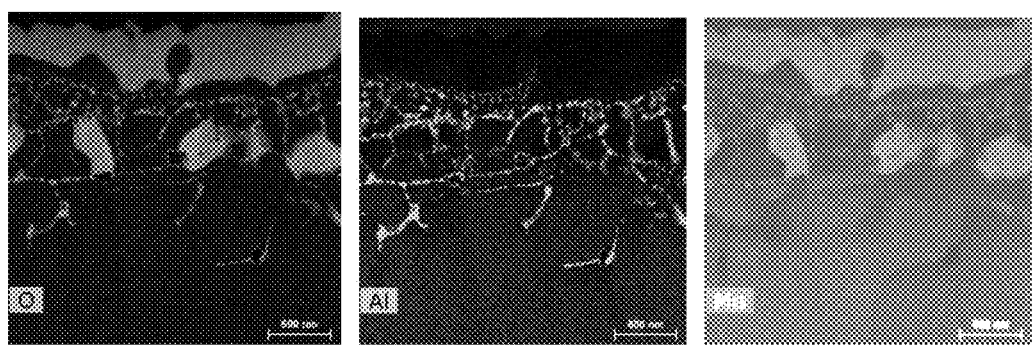
FIG. 7 shows maps of the O, Al, Mn elements in the cross-sectional metallographic phase of the skin layer after the primary annealing in Comparative Example 6.

FIG. 7 shows maps of the O, Al, Mn elements in the cross-sectional metallographic phase of the skin layer of Comparative Example 6 after the primary annealing, wherein the method for manufacturing the hot dipped high manganese steel according to the present disclosure was not utilized. As shown in FIG. 7, when the annealing temperature was 800° C., the dew point of the annealing atmosphere was +10° C., and the hold time was 180 s, although a fine ferrite grain layer was formed in the skin layer of the steel substrate, the oxide of aluminum was distributed randomly in the ferrite layer, and the main morphologies were granules and strips. At the same time, Mn oxide of a large size appeared in the ferrite layer. The above features had a negative influence on the formability of the skin layer of the steel plate.

Figure 8:
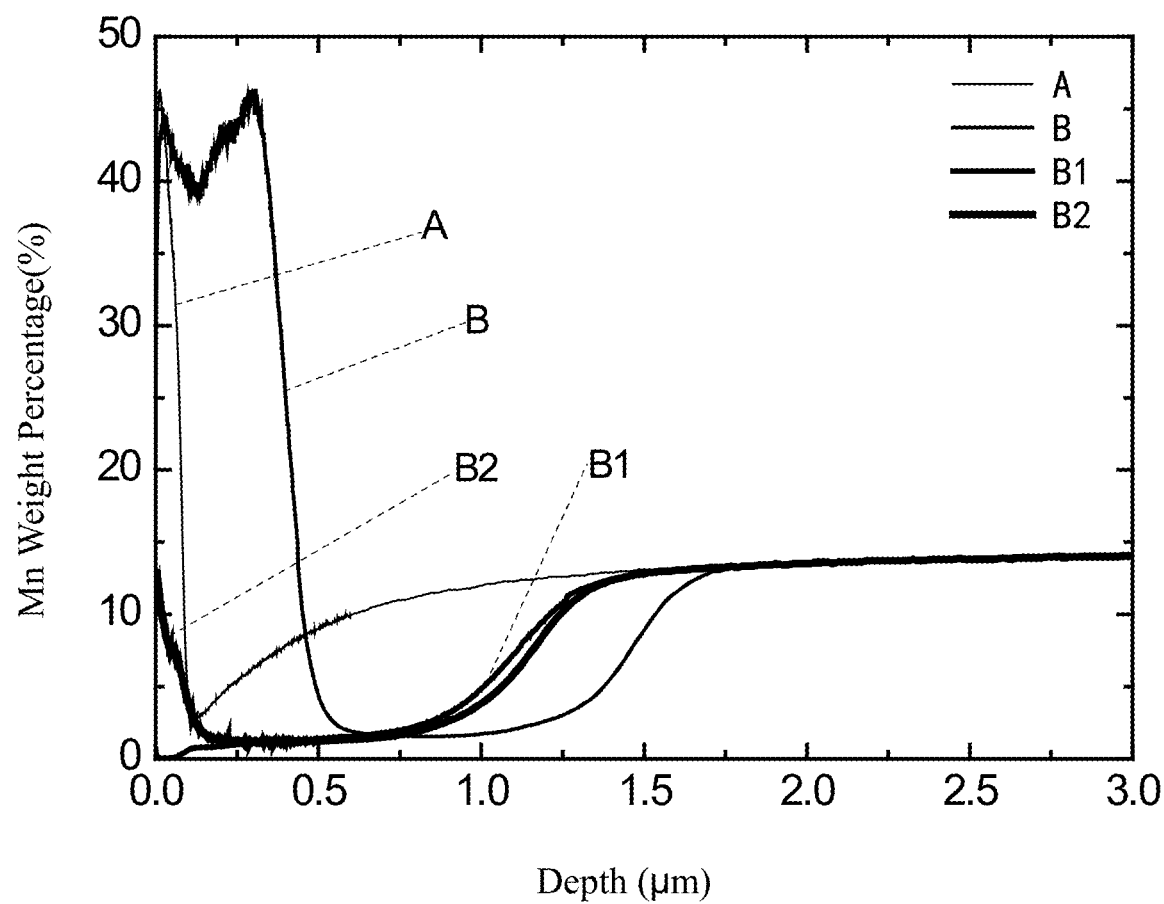
FIG. 8 shows distribution curves of the surface Mn element as a function of depth for Example 2 after the primary annealing, after the primary annealing and pickling, and after the secondary annealing, and Comparative Example 2 after the primary annealing.

FIG. 8 shows distribution curves of the surface Mn element as a function of depth for Example 2 after the primary annealing, after the primary annealing and pickling, and after the secondary annealing, and Comparative Example 2 after the primary annealing, wherein:

A represents an annealed steel plate obtained in Comparative Example 2 wherein the primary annealing atmosphere had a dew point of −40° C. The manganese oxide on the surface of the steel substrate was thin, and the manganese-lean skin layer of the steel substrate was not noticeable.

B represents a steel plate obtained after primary annealing in Example 2 wherein the dew point was 0° C. Manganese oxide of about 0.5 μm in thickness was present on the surface of the steel plate, and a manganese-lean skin layer of about 1 μm in thickness was present in the steel substrate. B1 was the distribution of the surface Mn element as a function of depth for the primarily annealed strip steel B after pickling, wherein the manganese oxide on the surface of the steel substrate was washed away with an acid, while the manganese-lean skin layer of the steel substrate was retained.

B2 was the distribution of the surface Mn element as a function of depth for the pickled strip steel B1 after secondary annealing in step (3), wherein a small amount of Mn was enriched in the surface of the strip steel B2, but far less than that in the surface of the strip steel A. As indicated by FIG. 8 showing the variation of the surface state of the strip steel at different stages, since the enrichment of the Mn element in the surface of the strip steel B2 was far less than that in Comparative Example 2, the platability of the strip steel B2 was improved greatly.

Table 3 lists the various property parameters and structural features of the hot dipped high manganese steel plates of Examples 1 to 20 and the conventional steel plates of Comparative Examples 1-12.

The platability was judged by directly observing the appearance of the strip steel after plating with naked eyes. If no iron was exposed obviously on the surface, the platability was good (indicated by ○); and if iron was exposed obviously on the surface, the platability was poor (indicated by x).

The coating adhesion was tested by taking a sample having a length of 200 mm and a width of 100 mm from a strip steel, bending it to an angle of 180 degree, flattening it, and adhering an adhesive tape to the bent position. If no zinc layer was peeled off by the tape or the bent surface of the bent coating to which the tape was once adhered did not pill, it suggested that the coating adhesion was good (indicated by ○); if the coating was peeled off by the tape or the bent surface of the bent coating to which the tape was once adhered pilled, it suggested that the coating adhesion was poor (indicated by x).

As shown by Table 3, the yield strength of Examples 1-20 was 450-650 MPa, the tensile strength was 950-1100 MPa, and the elongation at break was >50%. The thickness of the fine ferrite grain layer in Example 1-20 was 0.2-5 μm, the grain size of the fine ferrite grain layer was ≤5 μm, and both the platability and the coating adhesion were superior to those of Comparative Examples 1-10.

The reason is that a fine ferrite grain layer was formed on the surface of the steel substrate in step (2) in the Examples, so that the diffusion of Mn from the steel substrate to the surface of the steel plate was suppressed in step (3). This was advantageous for the formation of an effective Fe—Al barrier layer from Al and the fine ferrite grain layer in the plating bath, thereby providing good platability and coating adhesion.

In addition, since the steel substrate composition and the manufacturing method defined by the present disclosure were not used for Comparative Example 11-12, despite their good platability and coating adhesion, the steel plates of Comparative Example 11-12 were not characterized by a structure in which the steel substrate was austenite, and the skin layer of the steel substrate was a fine ferrite grain layer.

It is to be noted that there are listed above only specific examples of the invention. Obviously, the invention is not limited to the above examples. Instead, there exist many similar variations. All variations derived directly or envisioned from the present disclosure by those skilled in the art should be all included in the protection scope of the present disclosure.

TABLE 2

| | | Step (2) | | | | | | | Step (3) | | | |
|---|---|---|---|---|---|---|---|---|---|---|---|---|
| No. | Composition | Soaking Temp (° C.) | Soaking Time (s) | H₂ content (%) | Dew Point (° C.) | Acid Sol. Conc. (%) | Acid Sol. Temp. (° C.) | Pickling Time (s) | Soaking Temp (° C.) | Soaking Time (s) | H₂ Content (%) | Dew Point (° C.) |
| Ex. 1 | I | 700 | 290 | 7 | −15 | 4 | 64 | 9 | 750 | 160 | 8 | −42 |
| Ex. 2 | I | 680 | 170 | 9 | 0 | 5 | 69 | 10 | 750 | 120 | 8 | −56 |
| Ex. 3 | I | 640 | 500 | 6 | 20 | 4 | 55 | 9 | 800 | 120 | 4 | 4 |
| Ex. 4 | I | 640 | 590 | 10 | −4 | 2 | 51 | 2 | 670 | 90 | 4 | −3 |
| Ex. 5 | I | 720 | 40 | 4 | −19 | 3 | 58 | 4 | 650 | 140 | 7 | 2 |
| Ex. 6 | I | 680 | 370 | 4 | 5 | 4 | 66 | 9 | 740 | 90 | 6 | 10 |
| Ex. 7 | I | 710 | 370 | 1 | 10 | 1 | 63 | 5 | 680 | 110 | 4 | −35 |
| Ex. 8 | I | 670 | 140 | 9 | 12 | 3 | 61 | 9 | 840 | 290 | 7 | −39 |
| Ex. 9 | I | 630 | 350 | 7 | 20 | 3 | 50 | 3 | 850 | 100 | 4 | −13 |
| Ex. 10 | I | 620 | 180 | 7 | 8 | 5 | 59 | 2 | 620 | 70 | 2 | 10 |
| Ex. 11 | I | 680 | 490 | 3 | 15 | 1 | 53 | 9 | 800 | 330 | 6 | −53 |
| Ex. 12 | I | 640 | 400 | 8 | −13 | 3 | 58 | 5 | 700 | 200 | 7 | −58 |
| Ex. 13 | II | 690 | 180 | 10 | 11 | 5 | 61 | 2 | 620 | 170 | 6 | −49 |

TABLE 2-continued

|  |  | Step (2) |  |  |  |  |  |  | Step (3) |  |  |  |
| --- | --- | --- | --- | --- | --- | --- | --- | --- | --- | --- | --- | --- |
| No. | Composition | Soaking Temp (° C.) | Soaking Time (s) | H$_2$ content (%) | Dew Point (° C.) | Acid Sol. Conc. (%) | Acid Sol. Temp. (° C.) | Pickling Time (s) | Soaking Temp (° C.) | Soaking Time (s) | H$_2$ Content (%) | Dew Point (° C.) |
| Ex. 14 | II | 740 | 110 | 6 | −8 | 1 | 68 | 2 | 810 | 150 | 10 | −55 |
| Ex. 15 | II | 720 | 260 | 7 | 19 | 5 | 55 | 5 | 790 | 320 | 8 | 0 |
| Ex. 16 | II | 710 | 420 | 7 | −20 | 2 | 58 | 5 | 660 | 90 | 9 | 5 |
| Ex. 17 | III | 640 | 530 | 9 | −16 | 4 | 66 | 4 | 810 | 220 | 4 | −52 |
| Ex. 18 | III | 660 | 140 | 2 | −4 | 1 | 64 | 7 | 780 | 360 | 6 | −46 |
| Ex. 19 | III | 610 | 370 | 5 | 17 | 4 | 53 | 5 | 720 | 120 | 6 | −39 |
| Ex. 20 | III | 660 | 210 | 5 | −20 | 4 | 66 | 8 | 740 | 260 | 10 | −17 |
| Comp. Ex. 1 | I | / | / | / | / | / | / | / | 800 | 140 | 6 | −10 |
| Comp. Ex. 2 | I | / | / | / | / | / | / | / | 710 | 60 | 6 | −51 |
| Comp. Ex. 3 | I | / | / | / | / | / | / | / | 690 | 230 | 5 | −18 |
| Comp. Ex. 4 | I | / | / | / | / | / | / | / | 780 | 90 | 6 | −19 |
| Comp. Ex. 5 | I | 690 | 490 | 4 | −30 | 3 | 59 | 10 | 770 | 260 | 2 | −46 |
| Comp. Ex. 6 | I | 800 | 130 | 7 | 10 | 4 | 60 | 1 | 640 | 200 | 2 | −27 |
| Comp. Ex. 7 | II | / | / | / | / | / | / | / | 600 | 300 | 8 | −43 |
| Comp. Ex. 8 | II | 750 | 550 | 7 | −40 | 5 | 65 | 8 | 640 | 80 | 8 | −20 |
| Comp. Ex. 9 | III | / | / | / | / | / | / | / | 850 | 260 | 10 | −40 |
| Comp. Ex. 10 | III | 820 | 30 | 8 | 10 | 5 | 63 | 8 | 600 | 340 | 9 | −44 |
| Comp. Ex. 11 | IV | / | / | / | / | / | / | / | 690 | 190 | 10 | −20 |
| Comp. Ex. 12 | IV | 600 | 580 | 2 | −17 | 5 | 66 | 4 | 820 | 160 | 9 | −8 |

TABLE 3

| No. | Composition | Yield Strength (MPa) | Tensile Strength (MPa) | Elongation at Break (%) | Thickness of Fine Ferrite Grain Layer (μm) | Grain Size of Fine Ferrite Grain Layer (μm) | Platability (appearance) | Coating Adhesion |
| --- | --- | --- | --- | --- | --- | --- | --- | --- |
| Ex. 1 | I | 582 | 1056 | 56 | 0.4 | 0.3 | ○ | ○ |
| Ex. 2 | I | 506 | 974 | 57 | 1.7 | 1.0 | ○ | ○ |
| Ex. 3 | I | 645 | 1062 | 57 | 3.8 | 1.1 | ○ | ○ |
| Ex. 4 | I | 473 | 972 | 58 | 2.3 | 2.2 | ○ | ○ |
| Ex. 5 | I | 489 | 1087 | 61 | 3.4 | 2.2 | ○ | ○ |
| Ex. 6 | I | 630 | 980 | 65 | 4.0 | 1.4 | ○ | ○ |
| Ex. 7 | I | 634 | 1068 | 52 | 2.1 | 1.2 | ○ | ○ |
| Ex. 8 | I | 600 | 957 | 58 | 4.3 | 3.2 | ○ | ○ |
| Ex. 9 | I | 469 | 957 | 58 | 3.6 | 3.0 | ○ | ○ |
| Ex. 10 | I | 532 | 1093 | 56 | 3.0 | 2.7 | ○ | ○ |
| Ex. 11 | I | 578 | 971 | 53 | 2.5 | 2.2 | ○ | ○ |
| Ex. 12 | I | 615 | 984 | 50 | 4.5 | 2.4 | ○ | ○ |
| Ex. 13 | II | 575 | 960 | 63 | 1.2 | 1.0 | ○ | ○ |
| Ex. 14 | II | 596 | 986 | 58 | 4.2 | 3.8 | ○ | ○ |
| Ex. 15 | II | 529 | 952 | 62 | 2.9 | 2.5 | ○ | ○ |
| Ex. 16 | II | 622 | 990 | 54 | 1.8 | 1.8 | ○ | ○ |
| Ex. 17 | III | 492 | 975 | 52 | 0.8 | 1.2 | ○ | ○ |
| Ex. 18 | III | 549 | 959 | 62 | 4.5 | 2.7 | ○ | ○ |
| Ex. 19 | III | 458 | 1056 | 51 | 3.7 | 1.3 | ○ | ○ |
| Ex. 20 | III | 537 | 1027 | 57 | 1.2 | 1.0 | ○ | ○ |
| Comp. Ex. 1 | I | 642 | 1100 | 54 | 0.0 | / | x | x |
| Comp. Ex. 2 | I | 624 | 1070 | 56 | 0.0 | / | x | x |
| Comp. Ex. 3 | I | 590 | 994 | 52 | 0.0 | / | x | x |
| Comp. Ex. 4 | I | 464 | 950 | 60 | 0.0 | / | x | x |
| Comp. Ex. 5 | I | 576 | 1028 | 50 | 0.0 | / | x | x |

TABLE 3-continued

| No. | Composition | Yield Strength (MPa) | Tensile Strength (MPa) | Elongation at Break (%) | Thickness of Fine Ferrite Grain Layer (μm) | Grain Size of Fine Ferrite Grain Layer (μm) | Platability (appearance) | Coating Adhesion |
|---|---|---|---|---|---|---|---|---|
| Comp. Ex. 6 | I | 634 | 983 | 64 | 1.3 | 1.0 | ○ | x |
| Comp. Ex. 7 | II | 453 | 1049 | 62 | 0.0 | / | x | x |
| Comp. Ex. 8 | II | 641 | 1045 | 63 | 0.0 | / | x | x |
| Comp. Ex. 9 | III | 622 | 1002 | 51 | 0.0 | / | x | x |
| Comp. Ex. 10 | III | 501 | 1090 | 52 | 4.0 | 3.0 | ○ | x |
| Comp. Ex. 11 | IV | 450 | 778 | 25 | 0.0 | / | ○ | ○ |
| Comp. Ex. 12 | IV | 440 | 720 | 20 | 0.0 | / | ○ | ○ |

What is claimed is:

1. A hot dipped high manganese steel, comprising a steel substrate and a coating on a surface of the steel substrate, wherein the steel substrate has a core structure of austenite; the steel substrate has a skin layer which is a fine ferrite grain layer; the fine ferrite grain layer comprises an Al oxide, wherein the steel substrate comprises 10 to 30% Mn, 1 to 2% Al and 0.4 to 0.8% C by mass, and a balance Fe and unavoidable impurities.

2. The hot dipped high manganese steel according to claim 1, wherein the fine ferrite grain layer has a thickness of 0.2-5 μm.

3. The hot dipped high manganese steel according to claim 1, wherein the fine ferrite grain layer has a grain size of ≤5 μm.

4. The hot dipped high manganese steel according to claim 1, wherein the fine ferrite grain layer has a grain size smaller than a grain size of the austenite in the steel substrate.

5. The hot dipped high manganese steel according to claim 1, wherein the fine ferrite grain layer has a Mn content lower than the Mn content in the steel substrate.

6. The hot dipped high manganese steel according to claim 1, wherein the fine ferrite grain layer has a Mn content of ≤5%.

7. The hot dipped high manganese steel according to claim 1, wherein the fine ferrite grain layer has a Mn content of ≤2%.

8. The hot dipped high manganese steel according to claim 1, wherein the fine ferrite grain layer has an Al content higher than the Al content in the steel substrate.

9. The hot dipped high manganese steel according to claim 1, wherein the fine ferrite grain layer has an Al content of >1%.

10. The hot dipped high manganese steel according to claim 1, wherein the fine ferrite grain layer has an Al content of <5%.

11. The hot dipped high manganese steel according to claim 1, wherein the fine ferrite grain layer has a C content lower than the C content in the steel substrate.

12. The hot dipped high manganese steel according to claim 1, wherein the fine ferrite grain layer has a C content of 0.2%.

13. The hot dipped high manganese steel according to claim 1, wherein the coating has a thickness of 5-200 μm.

14. The hot dipped high manganese steel according to claim 1, wherein the hot dipped high manganese steel has a yield strength of 450-650 MPa, a tensile strength of 950-1100 MPa, and an elongation at break of at least 50%.

15. A method for manufacturing the hot dipped high manganese steel of claim 1, comprising the following steps:
1) Manufacturing a strip steel;
2) Primary annealing and pickling
wherein the strip steel is heated on a continuous annealing production line to a soaking temperature of 600 to 750° C. for a soaking time of 30 to 600 s, wherein a mixed gas of $N_2$ and $H_2$ is used as an annealing atmosphere which has a $H_2$ content of 0.5-10% by volume and a dew point of −20 to +20° C.; subsequently, the strip steel is cooled to below 100° C. after the annealing, and pickled with an acid solution having a hydrogen ion concentration of 0.1-5%, wherein the acid solution has a temperature of 50-70° C., and a pickling time is 1 to 10 s; then, the strip steel is rinsed, dried and coiled;
3) Secondary annealing and hot dipping
wherein the strip steel obtained in step (2) is subjected to secondary annealing and accomplishes hot dipping on a hot dipping production line, wherein the secondary annealing is performed at a soaking temperature of 600-850° C. for a soaking time of 60-360 s in an annealing atmosphere of a mixed gas of $N_2$ and $H_2$, wherein the annealing atmosphere has a $H_2$ content of 2-10% by volume, and a dew point of −60 to +10° C.; subsequently, the strip steel is cooled to 380 to 500° C., and then immersed in a plating bath to perform the hot dipping.

16. The method for manufacturing the hot dipped high manganese steel according to claim 15, wherein the soaking temperature in step (2) is 600-700° C.

17. The method for manufacturing the hot dipped high manganese steel according to claim 15, wherein the soaking time in step (2) is 30-180 s.

18. The method for manufacturing the hot dipped high manganese steel according to claim 15, wherein the annealing atmosphere in step (2) has a dew point of −10 to +10° C.

19. The method for manufacturing the hot dipped high manganese steel according to claim 15, wherein the plating bath in step (3) comprises, in mass percentage, 0.1≤Al≤6%, 0<Mg≤5%) and a balance of Zn and unavoidable impurities.

20. The method for manufacturing the hot dipped high manganese steel according to claim 15, wherein the annealing atmosphere in step (3) has a dew point of −60 to −20° C.

21. The method for manufacturing the hot dipped high manganese steel according to claim 15, wherein the plating bath in step (3) has a temperature of 420 to 480° C.

\* \* \* \* \*